Dec. 15, 1942.    W. D. HIRSCHKORN    2,305,254
BEAN CUTTER
Filed Dec. 2, 1940    3 Sheets-Sheet 1
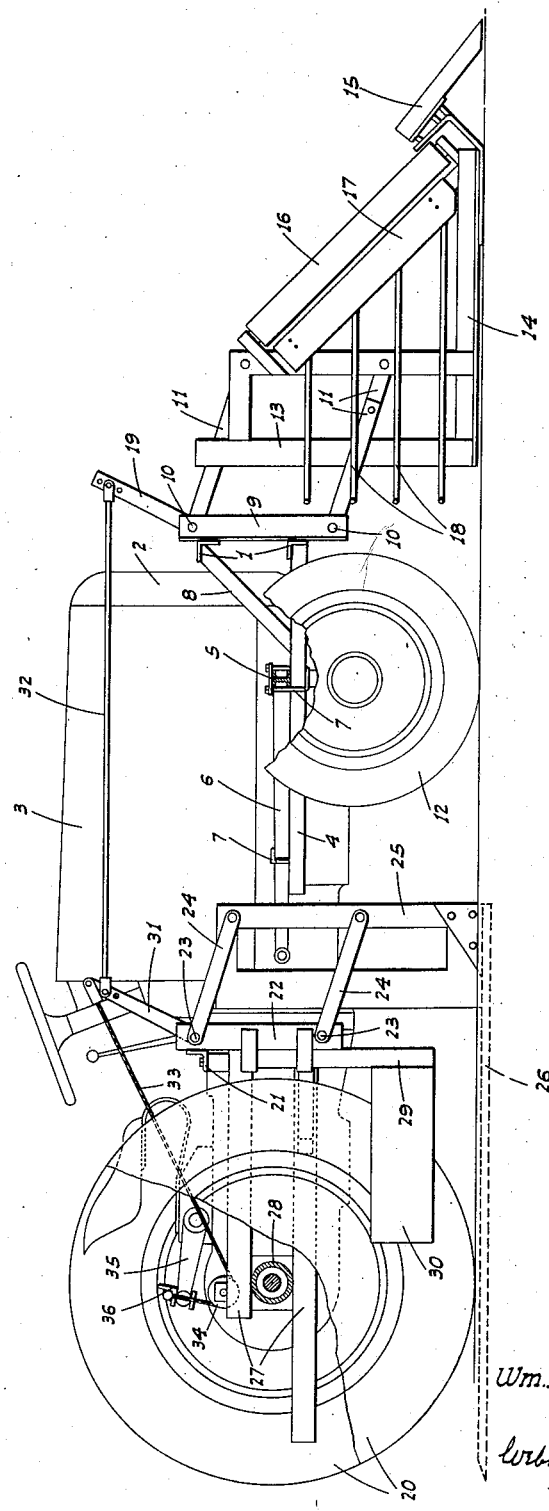
INVENTOR.
Wm.D.Hirschkorn
ATTORNEYS

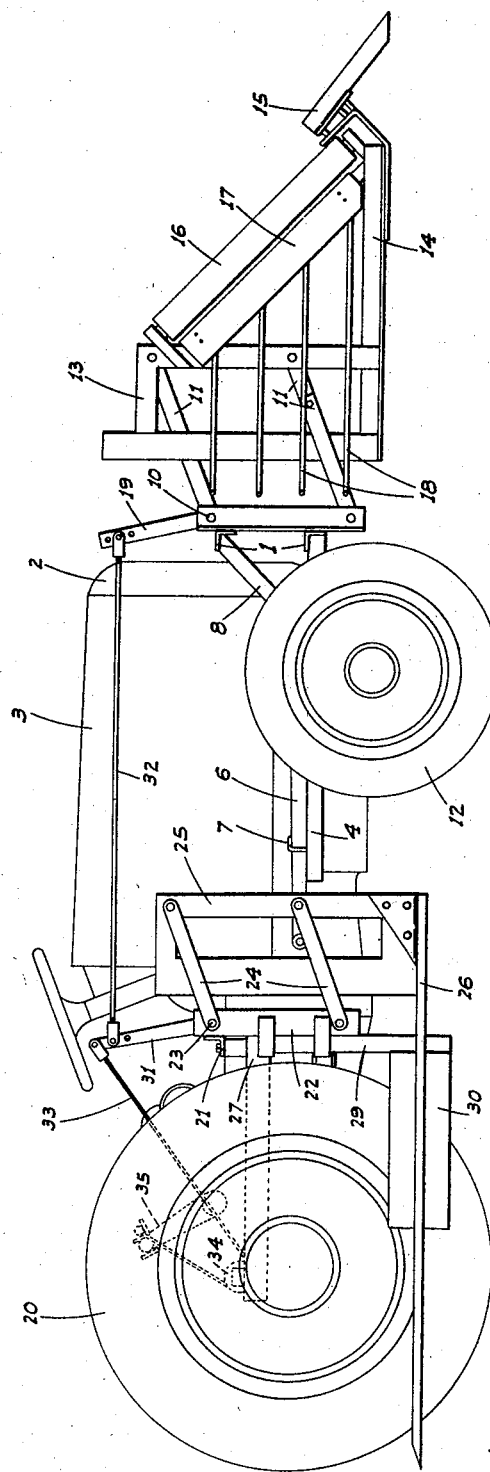

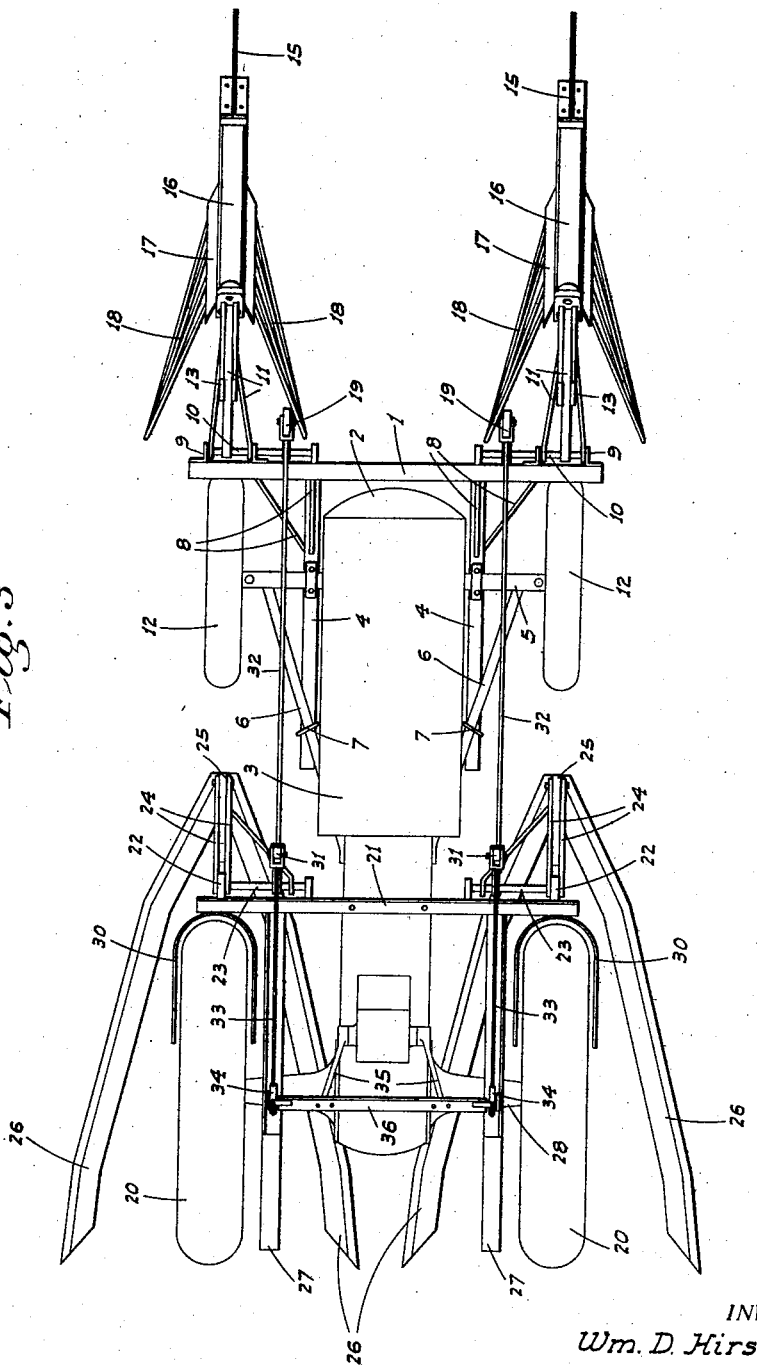

Patented Dec. 15, 1942

2,305,254

UNITED STATES PATENT OFFICE 2,305,254

BEAN CUTTER

William D. Hirschkorn, Livingston, Calif.

Application December 2, 1940, Serial No. 368,129

11 Claims. (Cl. 55—60)

This invention relates in general to an improved agricultural implement, and in particular the invention is directed to an improvement in tractor mounted bean cutters.

The principal object of this invention is to provide bean cutting apparatus designed to be mounted on a wheel tractor of the "Ford-Ferguson" type which includes manually controlled but hydraulically actuated power arms; the bean cutting apparatus being shifted to and from operating or bean cutting position by unique connection with said power arms.

Another object of the invention is to mount the bean cutting blades in connection with improved raising and lowering mechanism; such mechanism being so arranged that when the cutting blades are in the soil in bean cutting position they are forcefully held down as the tractor moves ahead, and any tendency of said blades to rise out of the soil, ride over hard spots, etc., is entirely overcome.

A further object of the invention is to provide cutting blades mounted in position ahead of each of the rear wheels of the tractor and splitter units mounted in position ahead of each of the front wheels of the tractor, and to mount such blades and splitter units for simultaneous raising or lowering movement; such simultaneous movement being effected from a power actuated element on the tractor and under the control of the operator.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the apparatus as mounted on a tractor and in operative position.

Figure 2 is a side elevation showing the apparatus in elevated or inoperative position.

Figure 3 is a plan view of the apparatus on a tractor.

Referring now more particularly to the characters of reference on the drawings, the numeral 1 indicates a pair of vertically spaced transversely extending angle bars which are disposed horizontally ahead of the radiator 2 of the tractor 3; such bars being mounted in rigid connection with the tractor by means of a pair of transversely spaced, rearwardly projecting bars 4 which extend from the lowermost angle bar 1 in underlying relation to the axle 5 and diagonal axle bracing 6 of the tractor, to which they are secured by U-bolts 7. Rigid braces 8 extend from the uppermost angle bar 1 downward to rigid connection with bars 4 ahead of axle 5. Adjacent their ends the angle bars 1 are connected together by means of vertically disposed angle members 9.

Relatively short horizontal shafts 10 are journaled on and in front of the angle bars 1 adjacent their ends, and each shaft carries a fixed, forwardly projecting link 11; corresponding upper and lower links being parallel and supporting a vine splitting unit ahead of the adjacent front wheel 12 of tractor 3.

Each vine splitting unit includes a pair of rectangular upstanding frames 13 disposed in laterally facing and spaced relation, and the links 11 slidably engage between said frames; the forward ends of said links being pivoted between the forward portions of said frames. Such frames are mounted in fixed connection at their lower end on a skid or shoe assembly 14, the forward end of which supports a vine cutting and splitting point or plate 15. A vine separating roller 16 is journaled between assembly 14 adjacent point 15, and the upper end portion of frames 13, such roller being disposed at an upward and rearward slant. Deflecting plates 17 are mounted between assembly 14 and frames 13 on opposite sides of and parallel to roller 16; said plates diverging rearwardly and each being fitted with a plurality of horizontal and likewise diverging vine deflecting rods 18.

The shafts 10 on the upper angle bar 1 are each provided with an upstanding radial lever 19 which is disposed in a longitudinal plane laterally outward of the tractor body or hood.

A bean cutting unit is disposed ahead of each of the rear wheels 20 of the tractor and a cross beam 21 mounted on top of the transmission housing and projecting laterally to a termination at its ends in front of wheels 20 supports such bean cutting units.

Each bean cutting unit includes a vertical standard 22 fixed on and depending from beam 21 adjacent the end of the latter. A relatively short shaft 23 is disposed in front of the beam 21 in parallel relation and is journaled thereon with one end projecting through standard 22. Upper and lower parallel links 24 extend forwardly from standard 22, and are arranged in pairs on opposite sides of an upstanding, rectangular and laterally facing frame 25. At their forward ends, links 24 are pivoted on the forward portion of frame 25; while the links are pivoted at their rear ends on opposite sides of standard 22. The shaft 23 serves as the pivot for the rear ends of the upper links 24 and such links are fixed on said shaft for swinging movement upon rotation thereof.

The frame 25, at its lower end, supports a pair of rearwardly projecting and diverging cutter blades 26 which are disposed substantially horizontal longitudinally and with a slight downward slope toward their outer or cutting edges.

In order to maintain standard 22 rigid in a vertical plane, horizontal beams 27 are secured on and project rearwardly therefrom; said beams being vertically spaced and the rear axle housing 28 engaging therebetween, and being secured thereto by suitable means. The lower beam on both sides of the tractor extends some distance rearwardly of the rear axle housing 28 in order to receive cross planks (not shown) which form a platform upon which weights may be placed to increase traction if necessary.

A vertical arm 29 is fixed on and depends from standard 22 and such arm supports a wheel guard 30 which is substantially U-shaped in plan and which is of substantial height. This guard is mounted in clearance relation to the ground, and serves as a means to deflect beans cut by the leading portions of the blades away from the adjacent wheel 20.

An upstanding radial lever 31 is fixed on each of the shafts 23 in longitudinal alinement and parallel to the corresponding one of the levers 19; tie rods 32 being connected between said corresponding levers 31 and 19. Flexible cables 33 are connected with levers 31 at the upper end thereof and thence extend at a downward and rearward slope to and about pulleys 34 from beneath. These pulleys are mounted on beam 27 below the rear or free ends of transversely spaced power actuated arms 35 on the transmission of the tractor, and to which arms the cables connect after passing about said pulleys. These arms are conventional and project rearwardly for vertical swinging movement, and such movement is controlled as usual by a lever (not shown) manipulated by the operator. A rigid cross bar 36 connects such power levers together to maintain them parallel.

In operation, the apparatus functions in the following manner:

When the power actuated arms 35 are in a lowered position, as is shown in Fig. 1, the radial levers 19 and 31 are disposed at a forward angle and the parallel linkage assemblies of both the bean splitting units and bean cutting units are then disposed with the forwardly projecting links thereof at a forward and downward angle. When in this position the skid or shoe assembly 14 engages the ground and with forward movement of the tractor the splitting point or blade 15 cuts through the tangled vines and thereafter the roller 16, plates 17 and rod 18 function to lay the split vines to both sides for passage of front wheels 12. At the same time blades 26 of the bean cutting units are slightly below the surface of the soil and pass therethrough with a slicing action, effectively severing the bean roots.

By virtue of the parallel linkage assemblies used to support both the bean splitting units and bean cutting units, said units have no tendency to ride away from the ground during forward progress of the tractor, and this is due to the fact that the parallel links are then in a forwardly and downwardly sloping position. This is particularly advantageous in connection with the bean cutting units as it tends to cause the blades to force into the ground rather than to rise therefrom. The cutting depth of blades 26 is controlled by the operator by slightly changing the position of power actuated arms 35.

When the apparatus is not in use and the tractor is in transit from place to place, the power arms 35 are raised which pulls on the cables and causes radial levers 31 and 19 to be rotated in a rearward direction. This in turn causes an upward swinging movement of the parallel linkage assemblies and with such movement the bean splitting units and bean cutting units rise simultaneously out of ground engaging position and to a position in substantial clearance relation thereto as is clearly shown in Fig. 2.

The apparatus herein described functions to cut bean vines rapidly and with a minimum of drag on the tractor; the apparatus is at all times under the control of the operator and thus is quite flexible to operating conditions; and the apparatus is so constructed that it can be assembled with the tractor or removed therefrom with comparative ease.

It will be noted that the lower ones of the links 11 and 24 are branched or of wishbone form, as shown in Fig. 3, in order to brace the structures against lateral deflection.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In the combination of a wheeled tractor and bean cutting apparatus mounted thereon; said apparatus including a standard mounted in position ahead of one of the tractor wheels, parallel links pivoted at one end on the standard and projecting forwardly therefrom for swinging movement in a vertical plane, a vine cutting unit supported by the other ends of said links and to which unit said other ends of the links are pivoted, and means to swing said links from a position with the cutting unit in ground engaging position to a position clear thereof, said links being disposed at a forward and downward slope from the standard when said unit is in ground engaging position.

2. In the combination of a wheeled tractor and bean cutting apparatus mounted thereon; said apparatus including a standard mounted in position ahead of one of the tractor wheels, parallel links pivoted at one end on the standard and projecting forwardly therefrom for swinging movement in a vertical plane, a vine cutting unit supported by the other ends of said links and to which unit said other ends of the links are pivoted, an element connected with one of said links and movable to swing said links from a position with the cutting unit in ground engaging position to a position clear thereof, a power actuated member on the tractor, and operating connections between said element and member.

3. A device as in claim 2 in which said element includes an upstanding lever swingable in a vertical plane lengthwise of the tractor, and in which said member is a pivoted arm projecting rearwardly for swinging movement in the same plane; said connections including a flexible cable connected between the lever and the arm, and a direction changing pulley about which the cable passes intermediate its ends.

4. In the combination of a tractor including a front and a rear wheel, and bean cutting apparatus mounted on the tractor, said apparatus including a vine engaging unit disposed ahead of said front wheel, a vine engaging unit disposed ahead of said rear wheel, separate means mounting said units on the tractor for raising and lowering movement, said means including transverse shafts, levers fixed on and projecting from said shafts in substantially the same direction, a tie element connecting said levers, a power actuated arm mounted on the tractor rearwardly of said levers, a flexible cable connected between the adjacent one of said levers and said arm, and a direction changing pulley on the tractor between said adjacent lever and said arm, the cable passing about said pulley.

5. In the combination of a tractor including a front and a rear wheel, and bean cutting apparatus mounted on the tractor, said apparatus including a vine splitting unit disposed ahead of said front wheel, a vine cutting unit disposed ahead of said rear wheel, separate means mounting said units on the tractor for raising and lowering movement, said means including transverse shafts, substantially radial levers fixed on and projecting from said shafts in substantially the same direction and in substantial alinement lengthwise of the tractor, a tie element connecting said levers, a power actuated arm mounted on the tractor, said arm being disposed rearwardly of said levers and pivoted for vertical swinging movement in a plane lengthwise of the tractor, a flexible cable connected between the adjacent one of said levers and said arm, and a direction changing pulley on the tractor between said adjacent lever and said arm, the cable passing about said pulley.

6. In the combination of a tractor including a front and a rear wheel, and bean cutting apparatus mounted on the tractor, said apparatus including a vine engaging unit disposed ahead of said front wheel, a vine engaging unit disposed ahead of said rear wheel, separate means mounting said units on the tractor for raising and lowering movement, said means including transverse shafts, levers fixed on and projecting from said shafts in substantially the same direction, a tie element connecting said levers, a power actuated arm mounted on the tractor rearwardly of said levers, a direction changing pulley mounted on the tractor below said arm, and a flexible cable connected between the adjacent one of said levers and said arm, said cable intermediate its ends passing about said pulley from below.

7. In the combination of a wheeled tractor and bean cutting apparatus mounted thereon; said apparatus including a standard mounted in position ahead of one of the tractor wheels, parallel links pivoted at one end on the standard and projecting forwardly therefrom for movement in a vertical plane, a vine engaging unit supported by the other ends of said links and to which unit said other ends of the links are pivoted, means connected with one of said links to swing the same from a position with the vine engaging unit in ground engaging position, to a position clear thereof, said means including a lever swingable in a vertical plane lengthwise of the tractor, a power actuated arm pivoted on the tractor in spaced relation lengthwise of the tractor from said lever and for swinging movement in the same plane as said lever, a flexible cable connected between said lever and said arm, and a direction changing pulley mounted on the tractor and about which pulley the cable passes intermediate its ends.

8. In the combination of a wheeled tractor and bean cutting apparatus mounted thereon; said apparatus including a cross beam secured on the tractor and terminating at its ends adjacent but ahead of the rear wheels thereof, standards secured on and depending from the end portions of said beam, a longitudinal beam fixed with and extending rearwardly from each standard, said beams engaging and being secured on the axle housing of the tractor, a vine cutting unit mounted in connection with each standard for raising and lowering movement, and means including a power actuated mechanism on the tractor to raise and lower said units; said means including a pair of levers, one cooperating with each unit, and said mechanism including a pair of pivoted arms, the arms and levers being swingable in a vertical plane lengthwise of the tractor, and separate cables connecting each of said arms with separate ones of said levers.

9. In the combination of a wheeled tractor and bean cutting apparatus mounted thereon; said apparatus including a cross beam secured on the tractor and terminating at its ends adjacent but ahead of the rear wheels thereof, standards secured on and depending from the end portions of said beam, a longitudinal beam fixed with and extending rearwardly from each standard, said beams engaging and being secured on the axle housing of the tractor, a vine cutting unit mounted in connection with each standard for raising and lowering movement, and means including a power actuated mechanism on the tractor to raise and lower said units; said means including a pair of levers, one cooperating with each unit, and said mechanism including a pair of pivoted arms, the arms and levers being swingable in a vertical plane lengthwise of the tractor, and separate cables connecting each of said arms with separate ones of said levers; there being a rigid cross beam connecting said arms for movement together and to the same extent.

10. In the combination of a tractor and bean cutting apparatus mounted thereon, the tractor including transversely spaced wheels; said apparatus including a separate vine engaging unit disposed ahead of each of said wheels, means mounting said units on the tractor for raising and lowering movement, and means including a power actuated mechanism on the tractor to raise and lower said units; said last named means including a pair of levers, one cooperating with each unit, and said mechanism including a pair of pivoted arms, the arms and levers being swingable in a vertical plane lengthwise of the tractor, and separate cables connecting each of said arms with separate ones of said levers.

11. In the combination of a tractor and bean cutting apparatus mounted thereon, the tractor including transversely spaced wheels; said apparatus including a separate vine engaging unit disposed ahead of each of said wheels, means mounting said units on the tractor for raising and lowering movement, and means including a power actuated mechanism on the tractor to raise and lower said units; said last named means including a pair of levers, one cooperating with each unit, and said mechanism including a pair of pivoted arms, the arms and levers being swingable in a vertical plane lengthwise of the tractor, and separate cables connecting each of said arms with separate ones of said levers; there being a rigid cross beam connecting said arms for movement together and to the same extent.

WILLIAM D. HIRSCHKORN.